J. J. HARRIS.
SPRINKLING CAR FOR MINES.
APPLICATION FILED APR. 24, 1913.
1,093,268.
Patented Apr. 14, 1914.
2 SHEETS—SHEET 1.
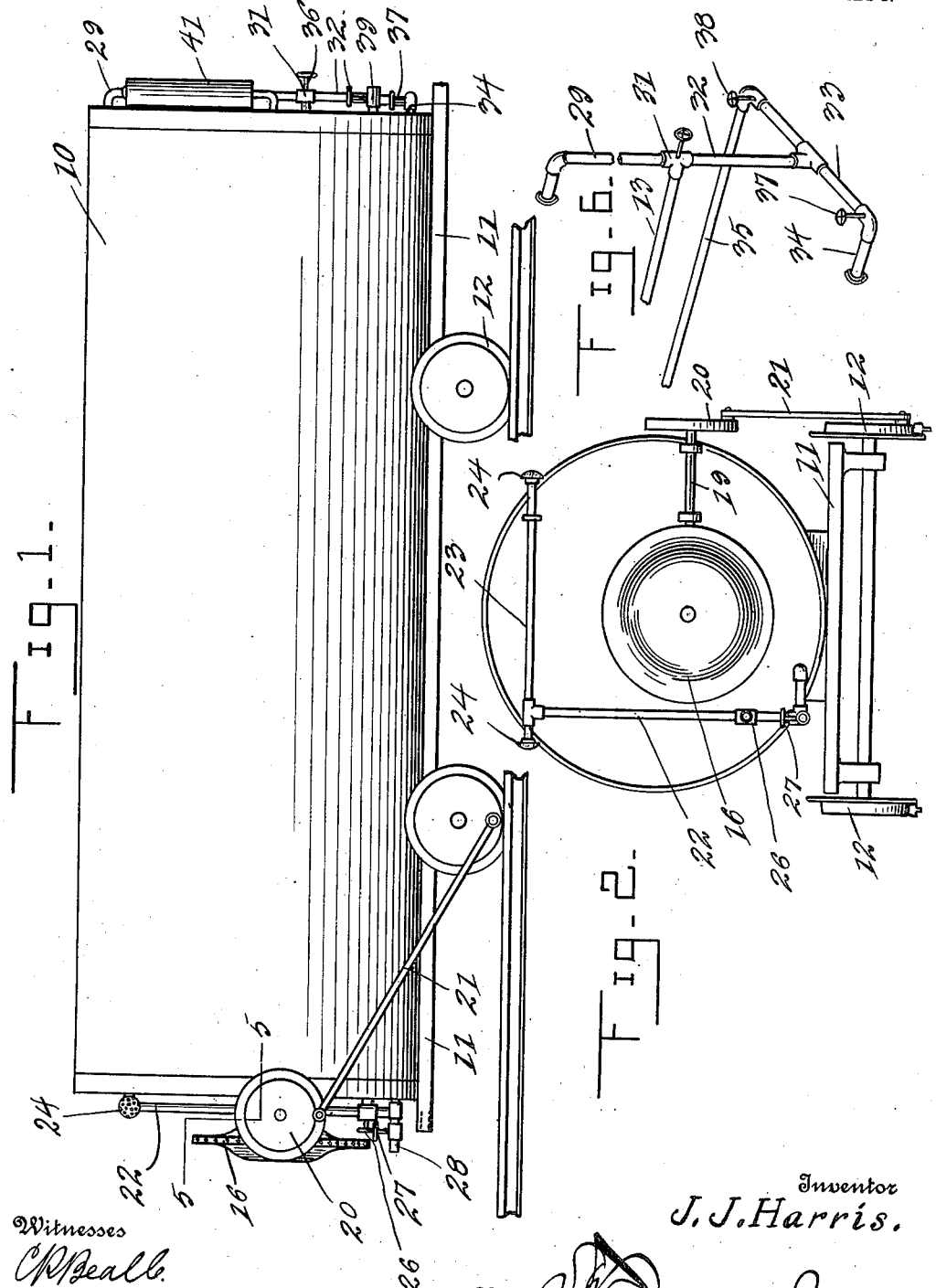
Witnesses
C. R. Beall
E. H. Jester
Inventor
J. J. Harris.
By
Attorney

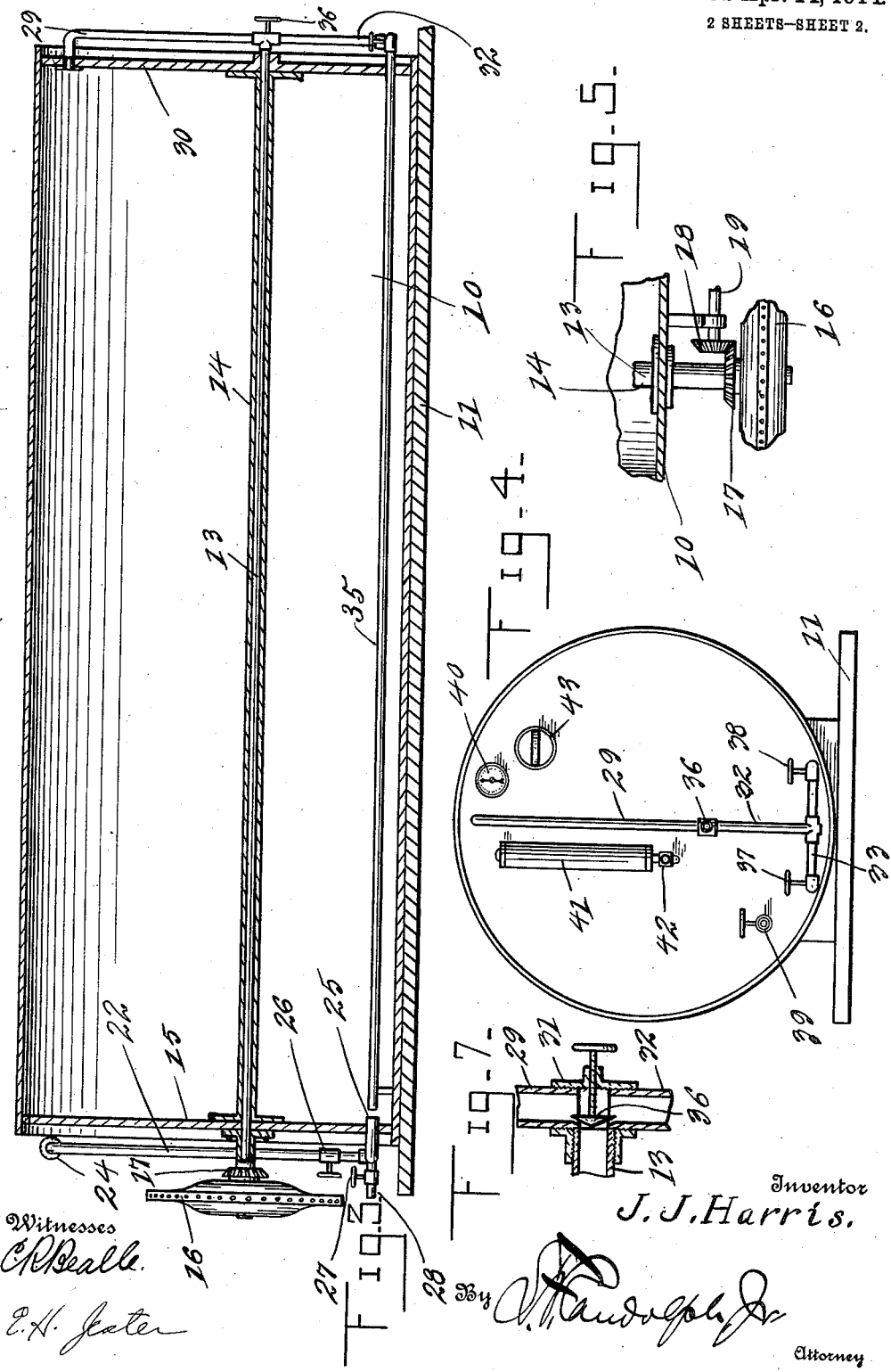

UNITED STATES PATENT OFFICE.

JESSE J. HARRIS, OF CANONSBURG, PENNSYLVANIA.

SPRINKLING-CAR FOR MINES.

1,093,268.    Specification of Letters Patent.    Patented Apr. 14, 1914.

Application filed April 24, 1913. Serial No. 763,416.

*To all whom it may concern:*

Be it known that I, JESSE J. HARRIS, a citizen of the United States, residing at Canonsburg, in the county of Washington and State of Pennsylvania, have invented certain new and useful Improvements in Sprinkling-Car for Mines; and I do hereby declare the following to be a full, clear, and exact description of the invention, such as will enable others skilled in the art to which it appertains to make and use the same.

This invention comprehends improvements in sprinkling cars for mines and has for its primary object the provision of a sprinkling car of this type which will be extremely useful in wetting down the ceilings, walls, floors, and other parts of a mine so as to settle the dust and thus avoid explosions.

Another object of the invention is to provide a mine sprinkling car so constructed as to discharge fresh air into the mine along with the water.

A further object of the invention resides in the provision of a sprinkling car for mines having a centrifugal sprinkler which is traction operated, and means for controlling the flow of air and water through the centrifugal sprinkler.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings in which, Figure 1 is a side elevation of my mine sprinkling car, Fig. 2 is a front elevation, Fig. 3 is a longitudinal sectional view through the tank, parts of the sprinkling apparatus being shown in elevation, Fig. 4 is a rear elevation of the tank, Fig. 5 is a detail view taken on the plane of line 5—5 of Fig. 1, Fig. 6 is a detail perspective view of the piping, and, Fig. 7 is a detail view of one of the connections and valve therefor.

In the preferred embodiment of my invention, I provide a tank 10, which is mounted upon a truck 11, having the wheels 12. A pipe 13 extends longitudinally through the tank within a pipe 14, which is flanged at its ends for attachment to the end walls of the tank. The pipe 13 projects through and beyond the front wall 15 of the tank and has a centrifugal sprinkler 16 revolubly mounted upon its extremity. This sprinkler is rigid with a beveled ring gear 17 which meshes with a bevel gear 18 rigid with the horizontal shaft 19. A disk 20 is rigidly secured to the outer end of the shaft 19 and is connected by a rod 21 with one of the wheels of the truck so that as the truck is moved the centrifugal sprinkler will be rotated. A vertical pipe 22 extends across the front wall of the tank and connects with a horizontal pipe 23 which carries the spraying nozzles 24. The lower end of the pipe 22 is in communication with the interior of the tank, as indicated by the numeral 25. A valve 26 controls the flow of water through the pipe 22 and a valve 27 controls the flow of water through the hose attaching pipe 28 which communicates with the pipe 22 between the valve 26 and its point of entrance into the tank. An air pipe 29 communicates at its upper end with the interior of the tank through the rear wall 30 and is secured at its lower end to a three-way coupling 31 to which the pipe 13 is also connected. A pipe 32 extends downwardly from the coupling 30 and connects to a horizontal pipe 33 centrally of its ends. One end of the pipe 33 is extended into the tank, as indicated at 34, whereas the other end is connected to a pipe 35 which runs longitudinally through the tank and terminates at a short distance from and in alinement with the end 25 of the pipe 22. A valve 36 is carried by the three-way coupling 31 for the purpose of closing the adjacent end of the pipe 13 without obstructing the communication between the pipes 29 and 32 at any time. Valves 37 and 38 control the passages through the pipe 33 on opposite sides of the pipe 32.

In use, water and air are forced into the tank through a suitable valve 39 until the pressure gage 40 shows that a desired amount of pressure has been produced within the tank. When it is desired to employ the centrifugal sprinkler 16 for spraying the water, the valves 36 and 37 are opened and the remaining valves are left closed. As the car is moved from place to place the sprinkler will be revolved, sucking air and water through the pipe 13, and discharging the same into the mine. The air will be drawn through the pipe 29 to the pipe 13 and the water will be drawn through the pipes 33 and 32 to the pipe 13. When it is desired to use the spraying nozzles 24 independently of the centrifugal sprayer the valves 36 and 37 are closed and the valves 38 and 26 opened. The pressure within the tank will force water through the pipes 22 and 23 to the spraying nozzles and the flow of water into the pipe 26 through its open end 25, will cause a certain amount of air to be sucked from the pipe 35 into the pipe 22. It will thus be seen that the operation of either of the sprinkling devices will cause a quantity of fresh air to be discharged into the mine and this is an important feature of my invention since it serves to purify the mine atmosphere by a discharge of fresh air therein. It will also be apparent that both of the spraying devices may be simultaneously operated if desired.

It is often necessary to extinguish fires within mines and with this object in view, I have equipped my sprinkling car with an acid reservoir 41 having a valve 42 which controls the flow of acid into the tank. In case of fire, carbonate of soda is introduced into the tank through the man head 43 and allowed to mix with the water. When a suitable acid is allowed to run into the tank a large amount of gas will be generated so as to produce a high pressure in the tank. This pressure is useful in forcing the liquid contents of the tank through a hose which may be attached to the pipe 28.

From the foregoing description taken in connection with the accompanying drawings, it will be apparent that I have provided a mine sprinkling car which is so constructed as to discharge fresh air and water simultaneously and thus purify the atmosphere of a mine by settling the dust therein and also by an introduction of fresh air.

The various parts of my device may be easily assembled and all of the valves are readily accessible so that the sprinkler may be easily and conveniently operated.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

A sprinkling car for mines, including a tank, a wheeled truck supporting the tank, a pipe extending longitudinally through the tank and extending beyond the ends thereof, a centrifugal sprinkler mounted upon one end of said pipe and communicating therewith, means connecting the sprinkler with one of the truck wheels, whereby the sprinkler is rotated on movement of the truck, an air pipe entering the tank above the water line and communicating with the other end of the first mentioned pipe, and a water pipe entering the tank below the water line and also communicating with the first mentioned pipe, a rotation of the sprinkler causing water and air to be drawn into it and discharged therefrom.

In testimony whereof I affix my signature in presence of two witnesses.

JESSE J. HARRIS.

Witnesses:
JOHN S. BUTLER,
B. M. KELSO.

Copies of this patent may be obtained for five cents each, by addressing the "Commissioner of Patents, Washington, D. C."